United States Patent [19]
Gallup et al.

[11] Patent Number: 5,288,411
[45] Date of Patent: * Feb. 22, 1994

[54] CONTROL OF SCALE DEPOSITION IN GEOTHERMAL OPERATIONS

[75] Inventors: Darrell L. Gallup, Chino; John L. Featherstone, El Centro, both of Calif.

[73] Assignee: Union Oil Company of California, Los Angeles, Calif.

[*] Notice: The portion of the term of this patent subsequent to Dec. 7, 2010 has been disclaimed.

[21] Appl. No.: 861,323

[22] Filed: Mar. 31, 1992

Related U.S. Application Data
[63] Continuation-in-part of Ser. No. 717,527, Jun. 19, 1991.

[51] Int. Cl.$^5$ ................................................ C02F 5/14
[52] U.S. Cl. .................................. 210/700; 60/641.5; 75/712; 75/733; 166/267; 210/701; 210/719; 210/727; 210/734; 210/737; 210/747; 210/713; 252/631; 252/633

[58] Field of Search ............................ 60/641.2, 641.5; 75/712, 726, 732, 733, 736; 166/267, 310; 210/713, 714, 696–701, 719, 723, 726, 728, 734, 747, 727; 252/631, 633

[56] References Cited

U.S. PATENT DOCUMENTS

| | | | |
|---|---|---|---|
| 3,336,221 | 8/1967 | Ralston | 210/700 |
| 3,663,448 | 5/1972 | Ralston | 210/700 |
| 3,958,635 | 5/1976 | Zilch et al. | 210/700 |
| 4,328,106 | 5/1982 | Harrar et al. | 210/700 |
| 4,510,059 | 4/1985 | Amjad et al. | 210/701 |
| 4,728,438 | 3/1988 | Featherstone et al. | 210/747 |
| 4,765,913 | 8/1988 | Featherstone | 210/747 |
| 4,933,090 | 6/1990 | Gill et al. | 210/701 |
| 5,044,439 | 9/1991 | Cenegy et al. | 210/701 |
| 5,049,297 | 9/1991 | Morris et al. | 210/696 |
| 5,082,492 | 1/1992 | Gallup et al. | 210/719 |

Primary Examiner—Peter Hruskoci
Attorney, Agent, or Firm—Gregory F. Wirzbicki; Charles L. Hartman

[57] ABSTRACT

Radioactivity and fluoride ion are inhibited or prevented from precipitating in scale formed from a geothermal brine by adding a scale inhibitor to the cooling brine solution. Preferred scale inhibitors include polyacrylate dispersants and phosphonomethylated amines.

49 Claims, 5 Drawing Sheets

CONTROL OF SCALE DEPOSITION IN GEOTHERMAL OPERATIONS

BACKGROUND OF THE INVENTION

This application is a continuation-in-part of U.S. patent application Ser. No. 717,527, filed Jun. 19, 1991, hereby incorporated in full by reference.

1. Field of the Invention

This invention relates to methods for inhibiting or preventing the deposition of alkaline earth scale from geothermally derived brines, particularly to methods of inhibiting or preventing the precipitation and inclusion of radioactive minerals and fluoride-containing minerals in scale derived from geothermal wells.

2. State of the Art

Large subterranean aquifers naturally produce steam or hot aqueous liquids, or, as used herein, "geothermal" steam or liquids. These aquifers, found throughout the world, often contain thermal energy in vast amounts. They are most commonly found where the earth's near-surface thermal gradient is abnormally high, as evidenced by unusually great volcanic, fumarole or geyser activity. Many geothermal aquifers are found around the rim of the Pacific Ocean, an area long known for its volcanic activity.

Recent research and development effort has focused on using geothermal resources to produce electrical power. This new use of geothermal resources is particularly advantageous, since recent steep cost increases for and shortages of petroleum fuel have resulted in the desire to find an alternative, and generally self-renewing, source of power plant "fuel."

In one process for producing electrical power, a naturally pressurized, hot, substantially liquid geothermal brine at over about 400° F. is flashed. This cools the liquid brine while reducing its pressure and converts some of the brine to steam. The steam produced in this manner then powers steam turbine generators. The cooled geothermal brine still retains enough heat to be used to advantage in binary systems. In these systems a low-boiling point, secondary liquid in a closed loop is vaporized by the relatively hotter, cooled geothermal brine. The vapor produced from the secondary liquid then is used to power gas turbine generators. Finally, the cooled geothermal brine and the steam condensate obtained from power generation are typically injected into the ground. This injection replenishes the aquifer and prevents ground subsidence.

The hot, highly saline brine used to generate power is saturated or nearly saturated in many ions and minerals. As the brine is flashed, many of these ions and minerals precipitate out. Some minerals form small particles and precipitate only slowly. These slowly precipitating small particles, typically silicon-containing compounds, particularly silica and silicate-containing minerals, such as iron silicate, must be forced out of solution before injection. Otherwise, they tend to precipitate in the injection wells, plugging them prematurely. Therefore, a flocculant is frequently added to the brine in a clarification process employing one or more settling tanks to speed the precipitation of these slowly precipitating minerals. U.S. Pat. No. 4,874,529 issued to Featherstone, which Patent is hereby incorporated in full by reference, discusses the problem of fine particulates not precipitating and describes adding a flocculating agent to the secondary clarification zone as the solution to the problem.

However, not all minerals precipitate from the brine solution slowly. Alkaline earth salts, for example, barium sulfate, also known as barite, and calcium fluoride, are among the minerals frequently found in large concentrations in geothermal brines. Alkaline earth salts tend to precipitate fairly quickly. During the flashing step both barium sulfate and calcium fluoride start to precipitate out of solution, and both continue to precipitate during further handling. Barium sulfate presents a problem in many geothermal systems since it starts to precipitate when the cooling brine is still as hot as 340° F. In a typical geothermal plant the brine is reduced to a temperature of 340° F. early on produced. Therefore, the precipitation of barium sulfate is a continuing problem throughout the process.

Recently it has been noticed that the crystalline material precipitated at some geothermal sites becomes more radioactive as the site ages. The radioactivity is contained in naturally occurring radioactive materials, or NORMs. They may result from tapping into new subterranean formations-containing trace amounts of the radioactive alkaline earth salt radium sulfate. Radium sulfate apparently coprecipitates with the chemically similar barium sulfate. It is important to reduce the levels of NORMs in the precipitate from the clarification process to as low a level as possible.

Likewise, it is important to reduce the concentration of NORMs in scale which forms in the equipment processing geothermal brine. Scaling of equipment, of course, is an undesired result, but because of the nature of geothermal brines, scaling is always a problem or potential problem. It becomes yet more of a problem if NORMs are present in the scale in unacceptable concentrations. Hence, it is important to keep the NORMs level low in any solids which form from geothermal brine—whether by scaling, clarification, or otherwise.

Increasing radioactivity is not the only problem with solids derived from brines in geothermal plants. The presence of fluoride ion can interfere with the recovery of valuable minerals, making mineral recovery from the scale uneconomical. Silver is an example of a valuable metal often found in large enough concentrations in geothermal brine to make silver recovery economical, in the absence of contaminating fluoride ion. U.S. Pat. No. 4,756,888 issued to Gallup et al., which patent is hereby incorporated in full by reference, teaches recovering silver in an apparatus, hereinafter referred to as a "line mine," that is incorporated into a geothermal power plant. U.S. patent application Ser. No. 07/559,042 by Gallup et al., which is hereby incorporated by reference in its entirety, teaches a process for obtaining precious metals (particularly silver) from geothermal brines. Fluoride tends to precipitate as an insoluble alkaline earth salt, particularly as the calcium or barium salt, when brines are processed to recover precious metals. Fluoride ion, in high concentrations, will corrode the metallurgical furnaces used for processing the scale, preventing the extraction of the valuable minerals present in the scale.

In view of the foregoing, it can be seen that geothermal brines often have dissolved components that cause processing problems. Three such components are NORMs, fluoride, and silicon-containing particulates. The NORMs, which are associated with barium sulfate, contaminate the scales and the clarifier precipitate with radioactive components. In a system where silver recovery is practiced, fluoride reduces the value of the recovered silver. Finally, in geothermal processing where silica, silicates, and other silicon-containing components are induced to precipitate in one or more clarification vessels, the slow precipitation of silicon-containing components requires the addition of a flocculating agent.

SUMMARY OF THE INVENTION

In the present invention, additives have been discovered which (1) reduce the level of NORMs associated with alkaline earth compounds in solids deposited from geothermal brines and/or (2) reduce the amount of fluoride solids which form with metal values (i.e. silver) deposited from geothermal brines. These additives function as scale inhibitors, preventing or inhibiting the deposition of NORMs and fluorides. Yet surprisingly, if these inhibitors are present in the brine entering a clarification stage where a flocculant is added to accelerate precipitation of silicon containing components, they do not affect the desired precipitation reactions. Thus, the invention provides for a selective process where the desired deposition of silicon, silicates, and other silicon-containing components occurs in a clarification stage while the precipitation of NORMs and/or fluoride is prevented or inhibited.

In the usual case, however, where silver and/or other metal values are recovered downstream of the clarification stage, there may be no reason to inhibit fluoride deposition in the clarification stage. Instead, the additive inhibiting fluorides from depositing is only needed upstream of the silver recovery stage, thus preventing undesired contamination of the recovered metal values with fluoride. In such embodiments of the invention, therefore, a first additive is employed during the clarification stage primarily to inhibit NORMs deposition while the flocculant promotes the deposition of silicon-containing components. After clarification, fluorides normally still remain in the brine, so that a second additive is employed during silver recovery to ensure the production of marketable metal values.

In the invention, the preferred scale inhibitors for preventing or inhibiting NORMs deposition are the phosphonoalkylated amines. Among the suitable scale inhibitors for preventing fluoride deposition (which usually and predominantly occurs in geothermal brines as calcium fluoride) are polyacrylates, polyphosphonic acids, polyethylene imines, phosphonoalkylated amines, sulfonated polyacrylates, aminoalkyl phosphonates, polyacrylateacrylamide copolymers, salts of polyacrylate, acrylic acid, polymaleic acid, acrylic acid-maleic acid copolymers, phosphate esters, and phosphonocarboxylate xylate.

Accordingly, in light of the foregoing, and with reference to a typical geothermal operation where brine is sequentially recovered from a subterranean formation, flashed to produce steam, clarified of silicon-containing solids, and ultimately re-injected into the formation, the discoveries in the invention can be used to advantage. In a preferred embodiment of the invention a high temperature geothermal brine is flashed to produce steam. This reduces the pressure and cools the remaining liquid brine. After flashing, the alkaline earth minerals, including a barium sulfate/radium sulfate coprecipitate, start to precipitate out of the cooled brine. A scale inhibitor, usually comprising a phosphonoalkylated amine, is added to the cooled brine. As a result, barium sulfate is inhibited from precipitating, and the radioactivity of the precipitate or solids produced is substantially less than that observed in a scale when no scale inhibitor is used. Surprisingly, this result is observed in clarification vessels where a flocculant is simultaneously used to enhance the silica settling rate. The observed result of this invention is that some ions and minerals can be forced to remain in solution while others are forced out of solution. It is interesting and unexplained that neither the flocculant nor the scale inhibitor seems to interfere with the action of the other.

In the preferred embodiment wherein silver (and/or other metal values) are recovered from the brine downstream of a clarification stage, an additive preferably comprising polyacrylate is added downstream of the clarification stage, but upstream of the silver recovery process. As a result, silver and/or other valuable metals are recovered accompanied by a lessened amount of detrimental fluoride.

BRIEF DESCRIPTION OF THE DRAWINGS

Like numbers in the various drawings refer to the same features. In particular, the various items shown in FIG. 1 are shown in FIGS. 2 and 3 with specific preferred components that perform the required functions.

DETAILED DESCRIPTION OF THE INVENTION

Figure 1:
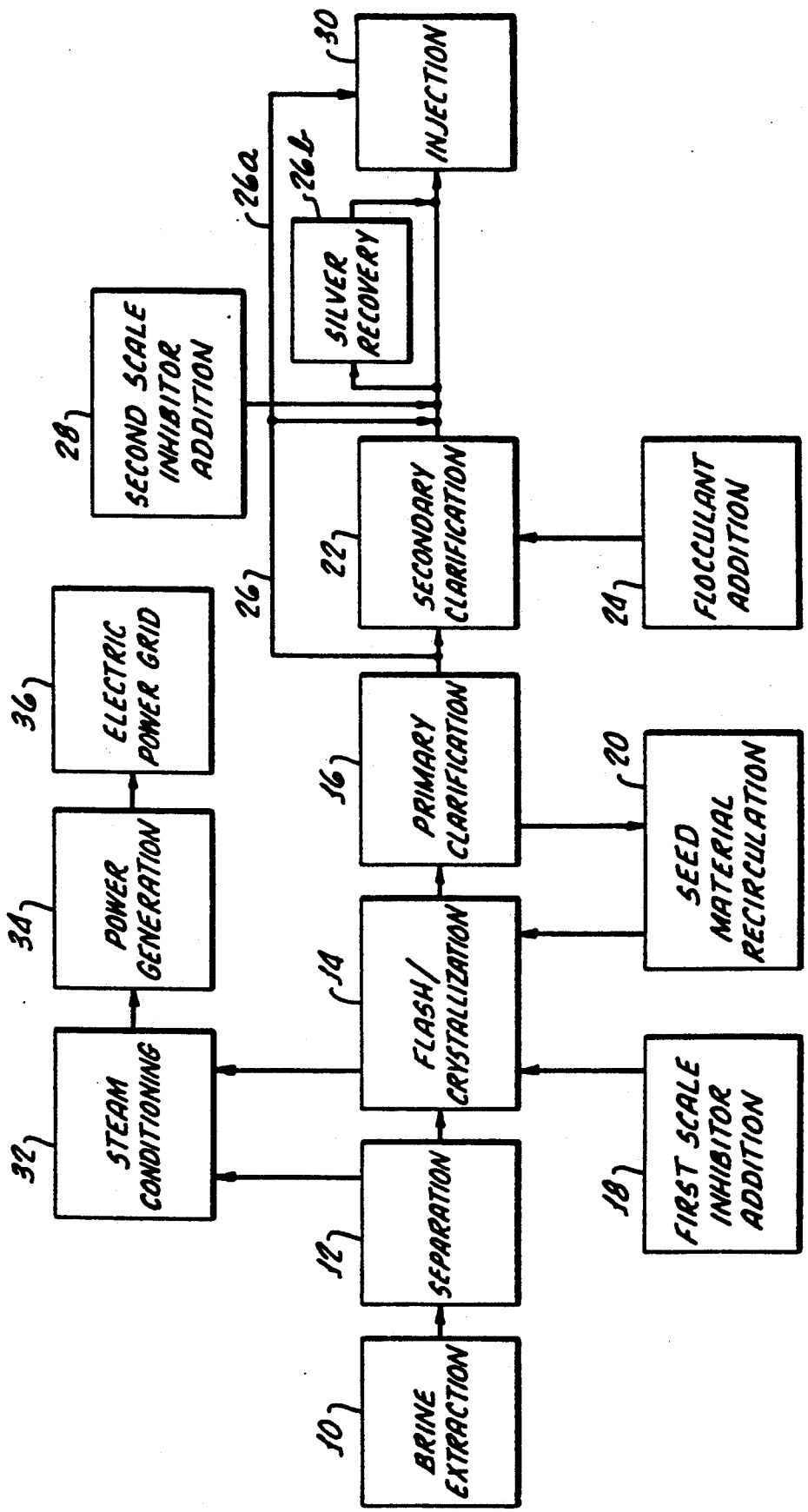
FIG. 1 shows a process flow scheme of a general geothermal plant that uses the process of this invention.

The process of this invention is most typically used in a geothermal power generating facility. Referring to FIG. 1, hot brine is extracted from the ground at the extraction step 10 The hot extracted brine is introduced to wellhead separation step 12 where steam is generated. The hot liquid brine still remaining flows to a flash crystallization step 14 where more steam is generated, concentrating and cooling the brine even more. The warm liquid brine effluent produced from the flash crystallization step is then pumped to primary clarification step 16 for removing silicon containing components. A first scale inhibitor addition step 18 introduces a first scale inhibitor to the primary clarification step 16. A seed material recirculation step 20 some crystallized material gathered at the primary clarification step 16 back to the flash crystallization step 14.

If the brine effluent from the primary clarification zone 16 is sufficiently free of solids to prevent downstream difficulties, e.g., plugging of injection wells, it may be directed by by-pass line 26 around a secondary clarification stage 22 If it is desired to recover silver or other valuable metals, the brine is combined with a second scale inhibitor 28 to prevent or inhibit fluoride deposition and then passed into a silver recovery process 26b (discussed in more detail hereinafter) followed by injection 30 back into the formation. If silver recovery is not desired, the brine from the primary clarification stage 16 can be passed via lines 26 and 26a directly into injection step 30.

If the solids removal in the primary clarification zone 16 is insufficient, the brine is passed into a secondary clarification zone 22 wherein a flocculant 24 is usually employed to induce precipitation of silicon-containing components. After secondary clarification, one again has the choice of either direct introduction to an injection well or treatment first for recovery of silver or other valuable metals, followed by injection.

Power is generated from steam formed at the wellhead separation step 22 and the flash crystallization step 24. The steam is introduced to a steam conditioning step 32 for cleaning. The cleaned steam is used in a power generation step 34 to generate electric power for the electric power grid 36.

In the first scale inhibitor addition step 18 and the second scale inhibitor addition step 28 the same or different scale inhibitors may be introduced. "Scale inhibitor" is a term to describe any additive to a brine stream that will inhibit or prevent any or all species found in the brine from producing a scale or other substantially solid material that settles out of the brine. As such, the term includes dispersants, crystal structure modifiers, and any other compositions that inhibit or prevent the formation of scale. Dispersants create an electric charge on the forming particles that causes each charged particle to repel like particles. Consequently, such particles remain entrained or suspended in the brine and do not contribute to the formation of scale. Crystal structure modifiers apparently interfere with the crystal growth of forming particles. Again, such particles remain entrained or suspended rather than contributing to the formation of scale. The scale inhibitors are preferably selected from the group consisting of polyacrylates, polyphosphonic acids, polyethylene imines, phosphonoalkylated amines, sulfonated polyacrylates, aminoalkyl phosphonates, polyacrylate-acrylamide copolymers, salts of polyacrylate, acrylic acid, polymaleic acid, acrylic acid-maleic acid copolymers, phosphate esters, and phosphonocarboxylate xylate. Both pure compounds and mixtures and blends of the compositions listed can be used.

In a preferred embodiment, two different classes of scale inhibitor are introduced at different locations in the flow scheme. A crystal structure modifier is introduced in a first scale inhibitor addition step 18 to the warm brine in the flash crystallization stage. A dispersant is introduced in a second scale inhibitor addition step 28 into the brine before injection. Particularly preferred crystal structure modifiers are the phosphonoalkylated amines. Particularly preferred dispersants are the polyacrylates.

Figure 2:
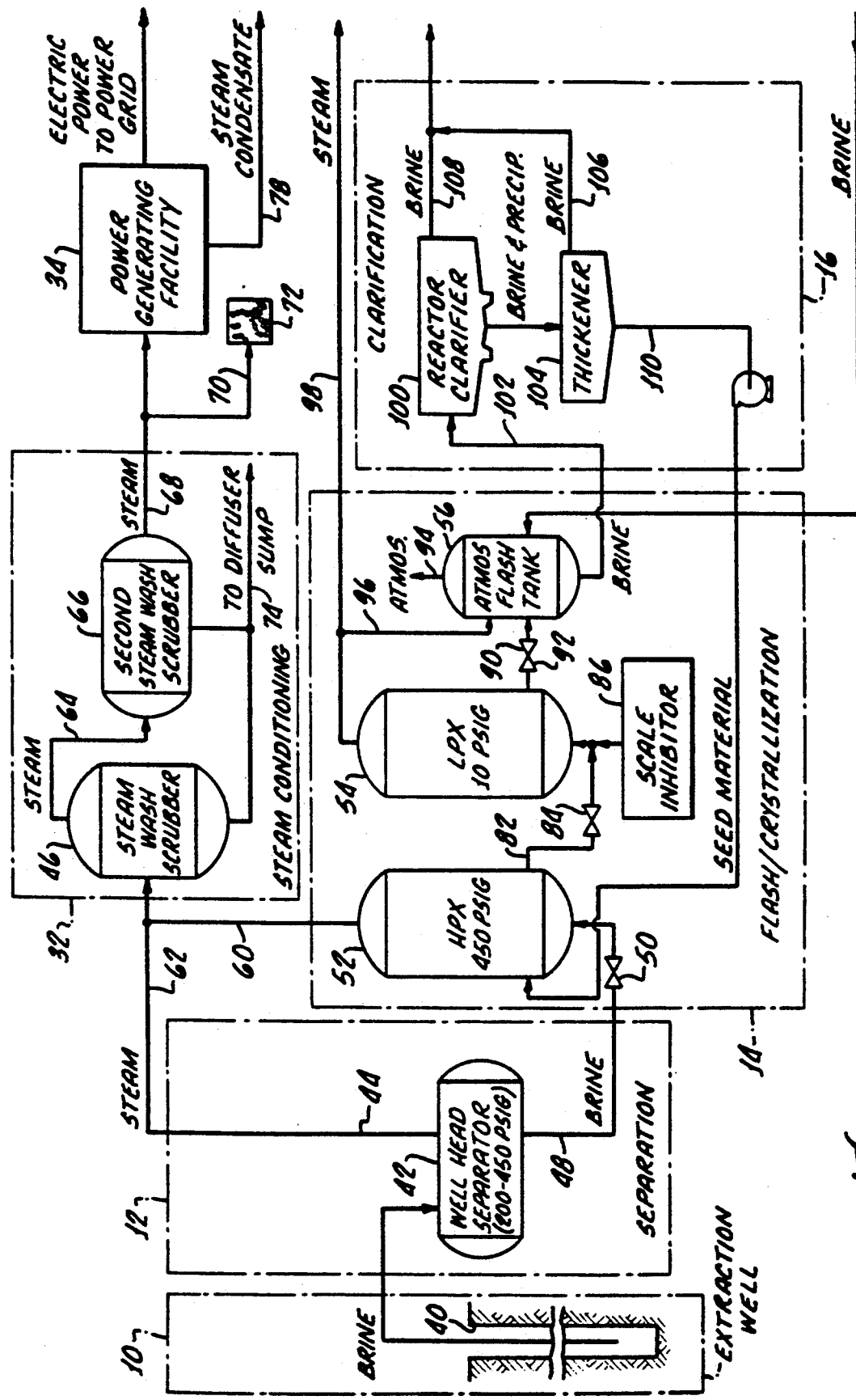
FIG. 2 shows a schematic drawing of one preferred layout.

In a specific preferred embodiment of a power plant shown in FIG. 2, brine and steam from well 40 flow to wellhead separator 42. The steam and brine are typically under pressure of about 200 to 350 psig and a temperature of about 400° F. to 600° F. In the wellhead separator 42, steam and the non-condensible gases are separated from the brine. The steam flows through conduit 44 to the steam scrubber 46. The brine flows from wellhead separator 42 through conduit 48 and past flashing valve 50 into the bottom of a high pressure flash crystallizer (HPX) 52. The liquid remaining in HPX 52 flows to low pressure flash crystallizer (LPX) 54, and an atmospheric flash vessel 56. Steam is produced and silica crystallization initiated at HPX 52, LPX 54 and the atmospheric flash vessel 56.

As the brine is flashed across flashing valve 50, from, for example, 450 psig, to a reduced pressure of, for example, about 120 psig, part of the brine is converted into high energy steam. Within HPX 52, the steam is separated from the brine. As an illustration, HPX 52 can provide about 95,000 pounds of steam per hour in a system extracting about 1.3 million pounds of brine per hour at about 450° F. and a pressure of about 450 psig at the well head separator. This steam flows from HPX 52 through conduit 60 into common steam discharge conduit 62, also receiving steam through conduit 44, to the steam scrubber 46. Partially cleaned steam is discharged from the steam scrubber 46, through conduit 64, to second scrubber 66. Clean steam is discharged from second scrubber 66, through conduit 68, to power generating plant 32. In the event the quality of steam discharged through conduit 68 from second scrubber 66 does not meet power generation requirements, for example, as to the level of total dissolved solids, the steam may be vented from conduit 70 to an atmospheric vent apparatus 72, for example, a rock-filled pit.

The mixture of wash water and steam condensate from scrubbers 46 and 66 is discharged, through conduit 74 to a diffuser sump 76. Steam condensate is returned from power generating plant 34, through a conduit 78 to a "condensate in" vessel 80 for disposal.

The flashing of the liquid brine in HPX 52 initiates the precipitation of siliceous material and alkaline earth salts. The brine and the precipitating siliceous material suspended in the brine in HPX 52 flow through conduit 82, past flashing valve 84, and into the bottom of LPX 54 at a temperature of about 340° F. It is preferred that the first scale inhibitor 86 be added to the liquid contained in LPX 54. About 0.5 to 8 ppmw, preferably 2 to 4 ppmw of a first scale inhibitor is added to the brine in conduit 82 before introduction in to LPX 54. As the brine flashes across flashing valve 84 to convert more of the brine into steam, the pressure is reduced further to, for example, about 10 psig. The mixture of brine, steam, and scale inhibitor is then fed into LPX 54 for separation. For the exemplary brine extraction system described above, the rate at which steam is separated from the brine in LPX 54 may also be about 95,000 pounds per hour. Such additional steam has less energy content than the steam separated in the HPX 52. Within LPX 54, additional silica may be deposited from the brine onto the silica particles entrained in the brine.

The first scale inhibitor, preferably a crystal structure modifier, is added via conduit 82 for subsequent introduction into LPX 54. Typically, the scale inhibitor is added in a concentration between about 0.5 and 50 ppmw, preferably between 1 ppmw and 10 ppmw, and most preferably between 2 and 8 ppmw. The preferred first scale inhibitor is typically selected from the phosphonoalkylated amines, described in detail hereinafter. Although the scale inhibitor can be added at other stages in the process, it is preferred to add the first scale inhibitor as soon as the brine cools enough for the scale inhibitor to be thermally stable. The scale inhibitor preferably is stable for the amount of time it takes for the brine and the added scale inhibitor to flow through the remainder of the process and be injected into the earth. A brine temperature of less than about 425° F., preferably less than 375° F., and most preferably less than 340° F., in the LPX 54 is cool enough for the addition of the scale inhibitor without usually encountering any thermal stability problems. The first scale inhibitor is then carried through the remaining liquid brine processing stages of the power generating facility.

Brine, solids suspended in the brine, and the added scale inhibitor are discharged from LPX 54, through conduit 90. This brine solution flashes across a third flashing valve 92 in conduit 90, to atmospheric pressure, creating still more steam which is separated from the brine in atmospheric flash tank 56. The additional steam formed has very little energy content and may be discharged from atmospheric flash tank 56, through a conduit 94, into the atmosphere. Alternatively, the steam may be used for facility heating or other heating purposes. To some extent, silica from the brine continues to crystallize from the brine onto the suspended siliceous material in atmospheric flash tank 56.

Processed liquid brine and suspended solids flow from the atmospheric flash tank 56 into the primary clarification zone 16. First they flow to reactor-clarifier 100 through conduit 102. Ordinarily, the brine overflow from thickener 104 is pumped through conduit 106 and combined with brine from reactor-clarifier overflow conduit 108. In one embodiment, the contents of conduit 108 are discharged into the secondary clarification step 22.

The effect of a crystal structure modifier is very dependent on the initial composition of the brine. Some brines treated with a crystal structure modifier will be so clear that no further treatment is necessary before injection into the earth. Therefore, in a preferred embodiment of the invention, such brine is treated with a crystal structure modifier and the resulting effluent is introduced directly into line 130 via line 108(*a*).

Brine from thickener 104 can be recycled back through primary clarification if the suspended solids concentration in the thickener overflow becomes excessive. This might happen, for example, due to settling problems in reactor-clarifier 100. Such settling problems are avoided in part by providing a steam blanket for the reactor-clarifier over the brine in the reactor-clarifier. A portion of the brine from thickener 104 is removed through conduit 110 and recirculated back to HPX 52 as seed material to initiate crystallization. Because of this recirculation a small amount of the first scale inhibitor will be found in HPX 52.

The thickener overflow is greatly diluted by the reactor-clarifier overflow. The dilution occurs because the thickener overflow rate is much smaller than the reactor-clarifier rate. Referring again to the illustrative system, assume the well extracts about 1.3 million pounds of brine per hour. About 130,000 pounds an hour of steam will be generated from the extracted brine. Then, about 1.1 million pounds per hour of the still liquid brine overflows from the reactor-clarifier. But the thickener overflow rate is only about 70 thousand pounds per hour. Consequently, the suspended solids concentration in the thickener overflow is generally comparable with the suspended solids concentration of the reactor-clarifier overflow and is not usually critical.

Figure 3:
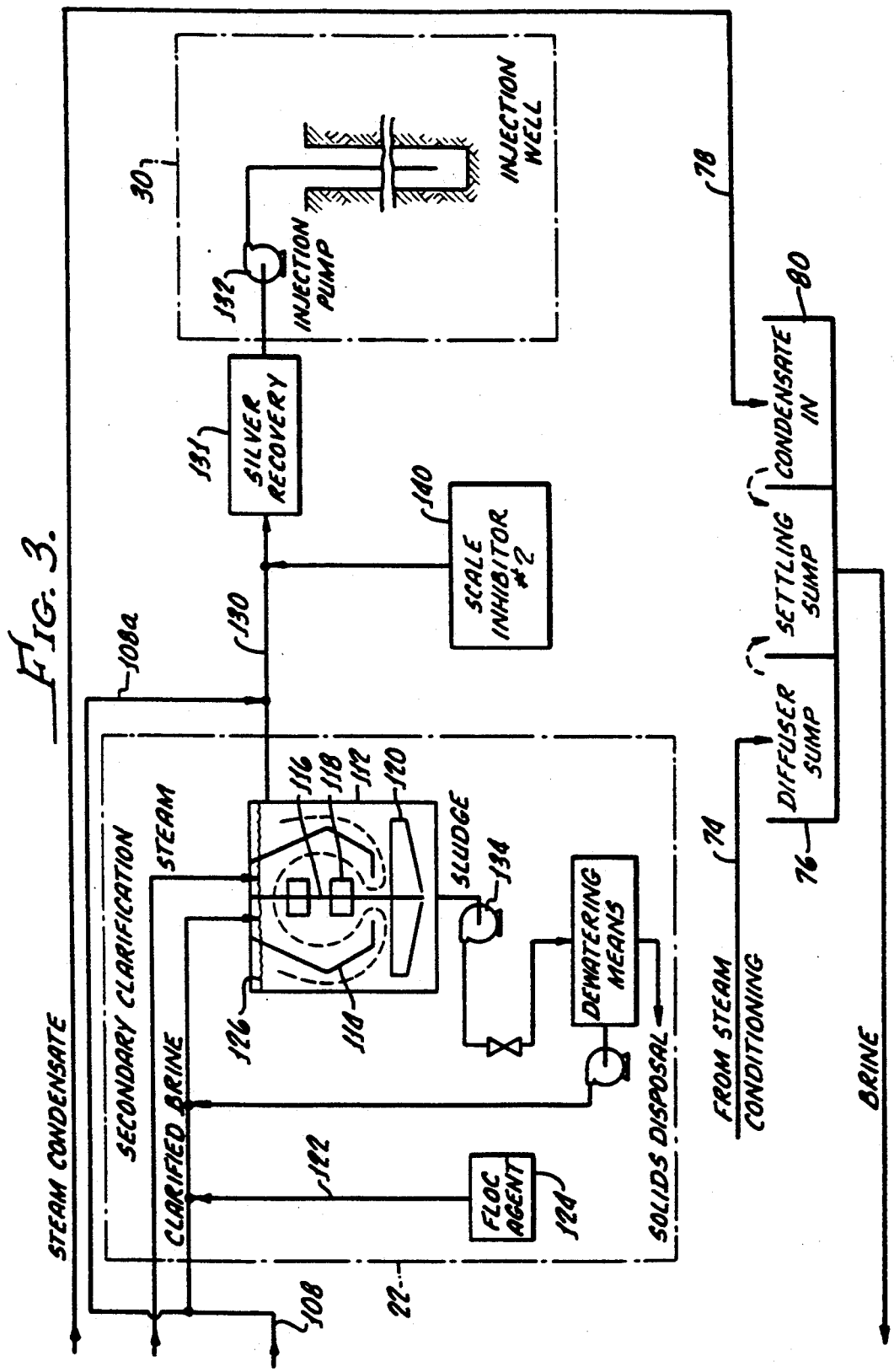
FIG. 3 shows a schematic drawing that is a continuation of the schematic shown in FIG. 2.

Secondary clarifier vessel 112, shown in FIG. 3, has a large internal reaction well 114 in which are mounted, on a vertical shaft 116, at least two rotatably driven mixing blades 118. Below a partially-open bottom of reaction well 114 are rotatably driven scraper blade means 120. Clarified brine effluent from reactor-clarifier 100 flows through conduit 108 into upper regions of secondary clarifier reaction well 114 along with thickener overflow from conduit 106, as described above. If added, a flocculant enters through conduit 122 from the flocculant tank 124. A slipstream of steam, from LPX 54, flows through conduit 98, into secondary clarifier vessel upper regions 112 to provide a steam blanket 126 over the surface of the liquid in the secondary clarifier vessel 112. A steam blanket 126 in vessel 112 excludes air from contacting the surface of the liquid contained in the vessel, thereby preventing oxidation of ferrous ions (Fe II) naturally present in the brine to ferric ions (Fe III). This prevents an increase in brine acidification. The chemical compatibility of the brine and steam blanket are assured by obtaining the steam used to form the steam blanket from the brine at LPX 54. This prevents possible secondary clarification process upsets.

Flocculant may be added to facilitate rapid precipitation of silica, but it is not required in the operation of this invention. If added, the flocculant enters the system in the secondary clarifier 22. The flocculant is preferably either a cationic, anionic, or non-ionic polyacrylamide (or mixtures thereof) having a high molecular weight, usually above about one million. The preferred flocculant is a cationic flocculant which is present in the secondary clarifier at a concentration of between 0.1 and 1.0 ppmw, preferably between 0.2 and 0.6 ppmw. The flocculant is preferably pumped from flocculant tank 124, through conduit 122 into brine effluent conduit 108, which is connected to the top of vessel 112. The flocculant speeds the precipitation of solids in the secondary clarifier. Within conduit 108, the flocculant is intermixed with the clarified brine overflows from both reactor-clarifier 100 and thickener 104 before the brine is discharged into secondary clarifier vessel 112. The brine and flocculant mixture in conduit 108 flows to secondary clarifier vessel 112. The inflowing mixture is naturally circulated downwardly through reaction well 114, while mixing blades 118 are rotated. Within vessel 112, the solids settled by the flocculant are raked, by means 120, to a solids-brine discharge conduit 134 located at the bottom of the vessel.

Reaction well 114 and vessel 112 are preferably constructed to provide a brine residence time in the reaction well between about 10 and about 20 minutes and to provide a total vessel brine residence time between about 45 and 150 minutes. Such residence times enable the fine residual solids suspended to be effectively flocculated and permit the flocculated material to settle to the bottom of vessel 112. More preferably, to minimize vessel size, the brine residence times in reaction well 114 and vessel 112 are respectively about 10 minutes and about 45 minutes. The preferred residence time results in the secondary clarified brine overflow preferably containing less than about 20 parts per million suspended solids, with the mean particle size being between about 3 and about 4 microns.

The discharged brine from vessel 112 flows through overflow conduit 130. If a dispersant is to be added, it is preferred that a dispersant 140 be added to the brine in the overflow conduit 130. In a particularly preferred embodiment, a dispersant is added to prevent fluoride ion precipitation. The secondary clarified brine then flows through a line mine 131. The preferred line mine is a section of pipe into which is placed coiled chicken wire. Among the materials that precipitate onto the chicken wire is silver. It will, of course, be appreciated that any other valuable material present in any particular brine could be recovered at this stage as well. The precipitated material will have less fluoride content than if no dispersant were added. The concentration of fluoride in the scale obtained from the line mine after addition of the dispersant will be no more 4.0 wt. % fluoride, more preferably no more than 0.4 wt. %, and most preferably no more than 0.04 wt. %.

After the deposition of silver and/or other metal values, the effluent from the line mine is then disposed of by injection into the earth. The effluent flows to injection pump 132. Injection pump 132 then pumps the brine into the earth in injection well 134.

As the brine is processed, prior to the clarification stages, some dissolved ions and minerals become supersaturated. The silicates, in particular, become supersaturated, but do not quickly settle out of solution. The resulting suspended silicate particles are difficult to flocculate in the clarifiers for two reasons. First, the suspended particles in the brine are present only in a low concentration. Second, the particles typically are of small size. For example, the brine might contain a concentration of about 150 parts per million of particles having a mean size of about 4 or 5 microns. However, the present inventors have discovered the surprising fact that adding flocculant in large amounts (even if one could use such amounts economically) retards rather than speeds the particle flocculation rate of the brine within vessel 112. It is believed that the use of flocculant in large amounts may cause the flocculant ions to repel each other, resulting in the observed retarding effect.

The particulate flocculation rate is also observed to be retarded if the brine flocculant mixing or circulation rate is increased (for example, by the faster rotation of mixer blades 118). This unexpected effect is possibly due to the increased agitation rupturing molecular bonds in the long-chain flocculant molecules. It has been observed that flocculants have little or no effect on the amount of radioactivity or fluoride ion present in precipitated or scaled solids.

Both fluoride ion and NORMs in precipitated solids present problems in the operation of geothermal power plants. Fluoride ion can cause problems with recovering valuable minerals from the scale formed by the brine, and the NORMs represent a potential hazard that should always be minimized. The precipitation of both NORMs and fluoride ion can be inhibited by adding to the brine a scale inhibitor. It has been found that a scale inhibitor comprising a crystal structure modifier preferentially prevents the deposition of both barium sulfate and NORMs, while a scale inhibitor comprising a dispersant preferentially prevents the precipitation of the fluoride compounds. Therefore, it is greatly preferred to use both a crystal structure modifier and a dispersant in a geothermal brine stream. Preferably, the crystal structure modifier selected reduces the concentration of NORMs in all solids produced throughout the system by at least about 33% from what is observed before addition. More preferably the concentration of NORMs is reduced at least about 50%. Preferably, the dispersant selected reduces the amount of fluoride ion deposited in the scale where valuable minerals are isolated by at least about 25%, preferably at least about 35%.

It is unexplained why a scale inhibitor should inhibit some dissolved solids from precipitating in a system where a flocculant is simultaneously used to accelerate the rate of precipitation of other solids. However, it is observed that adding a scale inhibitor to the cooling brine causes some minerals and ions to remain in solution, while the rate of precipitation of other solids is accelerated by the simultaneous addition of a flocculant. Preferred scale inhibitors are selected from the group consisting of polyacrylates, polyphosphonic acids, polyethylene imines, phosphonoalkylated amines, sulfonated polyacrylates, aminoalkyl phosphonates, polyacrylate-acrylamide copolymers, salts of polyacrylate, acrylic acid, polymaleic acid, acrylic acid-maleic acid copolymers, phosphate esters, phosphonocarboxylate xylate, and mixtures and blends of the compositions listed. The polyacrylate polymers preferably have molecular weights between about 2,500 and 20,000, preferably less than 5,000.

A scale inhibitor can be added to the brine stream in a number of places in a geothermal plant. The preferred locations are selected primarily on the basis of temperature. The temperature at the location of addition must be low enough that the scale inhibitor does not rapidly thermally degrade. The crystal structure modifier is preferably added at the LPX step 54. The dispersant is preferably added just before the injection step 30. However, both scale inhibitors are thermally sensitive. If the addition temperature is too hot, the scale inhibitor will degrade. Therefore, preferably, the brine temperature at the point of scale inhibitor addition will be cool enough to prevent thermal degradation of the scale inhibitor before the brine is injected back into the earth. It is preferred that the scale inhibitor be added to brine at a temperature less than about 400° F., preferably less than about 370° F., and most preferably less than about 340° F.

The scale inhibitor must be added to the brine in an effective concentration. The crystal structure modifier is normally added at a rate sufficient to produce concentrations of crystal structure modifier in the brine between about 0.5 and 50 ppmw, preferably between about 1 and 10 ppmw, and most preferably between about 2 and 8 ppmw. Likewise, the dispersant is added at a rate sufficient to produce concentrations of dispersant in the brine between about 0.5 and 50 ppmw, preferably between about 2 and 20 ppmw, and most preferably between about 4 and 10 ppmw.

Despite the similarities of their molecular structures, the preferred dispersants behave quite differently from the preferred flocculants. This odd behavior is emphasized by comparing the molecular formulas of the preferred classes of compounds. The preferred class of polyacrylate scale inhibitors has a repeating structure represented by formula (1):

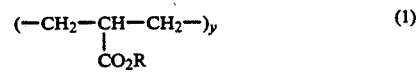
(1)

where R is selected from the group consisting of hydrogen and alkyl radicals having six or fewer carbon atoms and y=25 to 200. Preferably R is methyl or hydrogen. The preferred flocculants, on the other hand, have the similar repeating structure represented by formula (2):

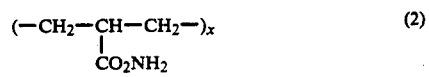
(2)

where x = 10,000 to 25,000.

where x= 10,000 to 25,000.

In general, it can be said that scale inhibitors have a lower polymer molecular weight and a higher charge than flocculants. Despite the seeming similarities in the chemical structures of the dispersants and flocculants the individual effects of the two are very different with the difference and the magnitude of difference being highly unexpected. Their influence on particles in solution is directly opposite. In the usual mode of operation of this invention, the dispersant is added downstream of the flocculant. However, if, in an alternative embodiment, the dispersant is added upstream of the clarifier stages, the dispersant is observed not to interfere with the action of the flocculant. Why they have such different and exclusive effects in the same system remains a mystery.

The preferred crystal structure modifier has a different structure than either the dispersant or the flocculant. The structure of one class of preferred crystal structure modifiers, the phosphonoalkylated amine, is shown in formula (3):

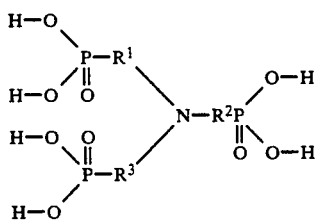

(3)

where $R^1$, $R^2$, and $R^3$ are the same or different and are (a) lower alkylene or (b) $NR^5R^6$, where $R^5$ and $R^6$ are the same or different, and $R^5$ can be a lower alkylene radical, hydrogen atom, or $R^7PO_3H_2$ (where $R^7$ is a lower alkylene radical), and $R^6$ can be a lower alkylene radical, a hydrogen atom, $(NR^8)_z$, where $R^8$ is defined the same as $R^5$ and $z$ is 1 to about 10, or $R^7PO_3H_2$ (where $R^7$ is a lower alkylene radical). All references to lower alkylene refers to alkylene radicals having from one to ten carbon atoms, preferably between one and six carbon atoms. At least one of $R^1$, $R^2$, $R^3$, $R^5$, $R^6$, $R^7$, or $R^8$ are a lower alkylene group. The various salts, for example, sodium and potassium salts, are also included. The presently preferred compound is phosphonomethyl amine, that is $R^1$, $R^2$, and $R^3$ are all methylene groups.

The structure of a second class of preferred crystal structure modifiers included in formula (3) is shown in formula (4):

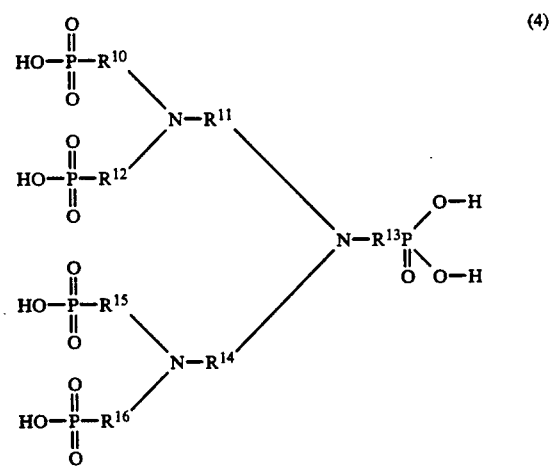

where $R^{10}$, $R^{11}$, $R^{12}$, $R^{13}$, $R^{14}$, $R^{15}$ and $R^{16}$ are the same or different and are lower alkylene, where lower alkyl is the same as previously described. The various salts, for example, sodium and potassium salts, are also included.

It will of course be appreciated that the most economical dispersants, flocculants, and crystal structure modifiers are technical grade compositions. Usually these compositions contain large amounts of components (e.g., inert ingredients) not described above. Cost considerations aside, it would be preferred to use pure compounds in the method of this invention. However, the technical grade compositions commercially available are useful in the method of the present invention. The concentration of active ingredient in any particular commercially available material is not generally important. It is only necessary that enough of the material be used to produce the desired concentration of the active ingredient in the brine. Preferably, however, the material will contain at least about 33 wt % of the active ingredients. It is especially preferred that the material contain more than about 50 wt % of the active ingredients.

EXAMPLES

The invention is further described by the following examples, which are illustrative of various aspects of the invention and are not intended as limiting the scope of the invention as defined by the appended claims.

Examples 1 Through 7

The experiments of Examples 1 through 7 were all performed in the same way. Clarified brine was taken from a commercial geothermal power plant operated in a manner similar to that shown in FIGS. 2 and 3 and described hereinbefore. The brine taken for testing the concentration of primary solids was taken from the brine effluent conduit 108. The brine for testing the concentration of secondary solids was taken from the secondary clarifier overflow 130. The brine taken for testing the amount of scaling had a temperature of about 220° F. and was under a pressure of about 100 psig. A series of tests, each lasting for up to about 120 hours, was performed on the scale inhibitors listed in Table I. The concentrations of solids and amounts of scale produced from brine when the various scale inhibitors were added to the flash/crystallizer were compared to the properties of untreated brine. The results were tabulated in Table I. The properties measured were total scale deposited, $BaSO_4$ deposited, $CaF_2$ deposited, radioactivity, radioactive nucleotides deposited, and the concentration of solids in the brine.

Primary Clarifier Solids

Geothermal fluid was obtained from the primary clarifier overflow 108 and the reaction well 114 from the secondary clarifier in a geothermal plant. The amount of particulates was measured by light scattering of a sample in a transparent tube, with the results observed being discussed below and summarized in Table I.

Scale

A clarified geothermal fluid obtained from the secondary clarifier 130 comprised about 70 percent by weight brine and about 30 percent by weight steam. The geothermal fluid had a temperature of 220° F. and a pressure of 100 psig. The brine contained about 251,000 ppmw of various elements dissolved therein: less than 0.3 aluminum, 0.2 silver, 1.0 antimony, 12.8 arsenic, 319 boron, 200 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 50,000 sodium, less than 0.1 nickel, 81 lead, 73 rubidium, less than 1 selenium, 200 silicon, 400 strontium, at least 25 sulfate, and 302 zinc.

The apparatus utilized in the tests includes a three inch conduit along with a first corrosion/scale inspection spool. The brine flows through and then exited the system through a second corrosion/scale inspection spool. The two corrosion/scaling spools were sections of conduit which hold conventional carbon steel corrosion strips to monitor the corrosiveness of brine. The second corrosion/ scale spool was of a length sufficient to provide a total residence time of about 1 minute for the brine flowing through the test apparatus. At the exit from the simulated injection conduit the brine is normally at a temperature of about 220° F.

Scale buildup on the piping was measured by gamma radiographic techniques employing an Iridium 92 source. The source and film plate were positioned on opposite sides of the area of interest. The differences in gamma absorption of the brine, scale and steel results in sufficient contrast to produce a radiograph from which projected thickness of scale were measured. At the conclusion of each test, the two corrosion/scaling spools were removed and inspected, with the results observed being discussed below and summarized in Table I.

Radioactivity

Scale from a geothermal plant was analyzed using gamma ray spectroscopy. The amounts of the radioactive nucleotides radium-226 ($Ra^{226}$), radium-228 ($Ra^{228}$), and thorium-232 ($Th^{232}$) were determined by the amount of the characteristic gamma radiation each emits, and the decrease in that amount of each after use of the scale inhibitor noted. The results of the spectroscopy are shown in Table II.

TABLE I

Test Results

| Type | % Decrease |  |  |  |  |
|---|---|---|---|---|---|
|  | Scale | BaSO4 | CaF2 | Primary Clarifier Solids | Secondary Clarifier Solids |
| Example 1 |  |  |  |  |  |
| Polymeric phosphonic acid | 26 | 59 | 38 | 5 | −17 |
| Example 2 |  |  |  |  |  |
| Polyacrylate | 2 | 77 | 76 | 14 | −32 |
| Example 3 |  |  |  |  |  |
| Phosphonomethylated amine | 44 | 97 | 95 | 4 | 6 |
| Example 4 |  |  |  |  |  |
| Polyethylene imine | 31 | 35 | 26 | N.D. | N.D. |
| Example 5 |  |  |  |  |  |
| Polyacrylate | 53 | 93 | 92 | 42 | 69 |
| Example 6 |  |  |  |  |  |
| Polymeric phosphonic acid | 47 | 86 | 89 | 41 | 41 |
| Example 7 |  |  |  |  |  |
| Polyacrylate | 13 | 90 | 95 | 21 | 35 |

Note: The negative values indicate an increase in the amount of secondary clarifier solids observed.

It can be seen from Table I that the best dispersant, in terms of reducing both $BaSO_4$ and $CaF_2$, were the dispersants of Example 2 and 7, both polyacrylates, and the crystal structure modifier of Example 3, a phosphonomethylated amine. Oddly, the scale inhibitor of Example 2 resulted in an increase in solids in the primary clarifier. The significance of this increase is unclear, but overall the polyacrylate of Example 2 is the preferred scale inhibitor. All scale inhibitors tested resulted in some decrease in $BaSO_4$ and $CaF_2$.

TABLE II

| Example | Type | pCi/g Ra-226 | % Decr vs Baseli | pCi/g Ra-228 | % Decr vs Baseli | PCi/g Th-232 | % Decr vs Baseli |
|---|---|---|---|---|---|---|---|
|  | Base Line | 100 |  | 150 |  | 12 |  |
| 1 | Polym. phosph A | 58 | 42 | 80 | 47 | 7 | 42 |
| 2 | Polyacrylate | 21 | 79 | 30 | 80 | 2.2 | 82 |
| 3 | Phosp methy am | 12 | 88 | 20 | 87 | 1.7 | 86 |
| 4 | Poly eth imine | 90 | 10 | 130 | 13 | 8.6 | 28 |
| 5 | Polyacrylate | 28 | 72 | 40 | 73 | 3.9 | 68 |
| 6 | Polyphos acid | 34 | 66 | 52 | 65 | 5.4 | 55 |
| 7 | Polyacrylate | 15 | 85 | 23 | 85 | 1.5 | 88 |

It can be seen from Table II that the scale inhibitors of examples 2 and 7, both polyacrylates, and the scale inhibitor of example 3, a phosphonomethylated amine, reduced the amount of radioactivity found in the deposited scale the most.

Example 8

In this example, two scale inhibitors (a dispersant and a crystal structure modifier) were tested at different times. The first scale inhibitor was a polyacrylate dispersant added continuously to the brine at the LPX to give a constant concentration of 8 ppmw in the brine.

Figure 4:
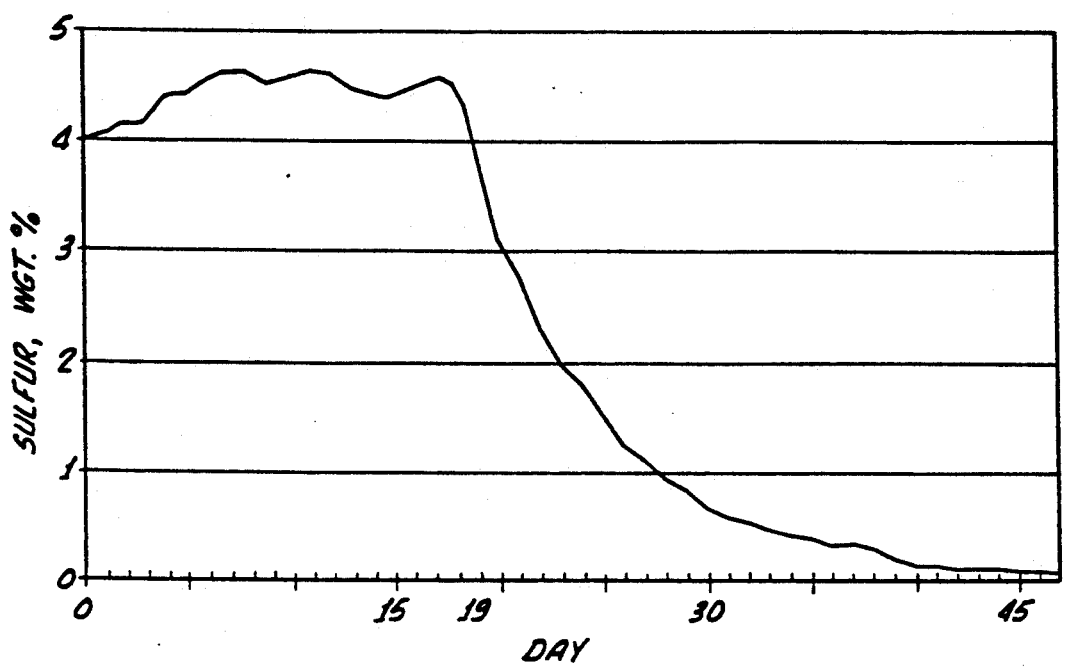
FIG. 4 shows a graphical representation of sulfur concentration versus day number using the method of the present invention.
Figure 5:
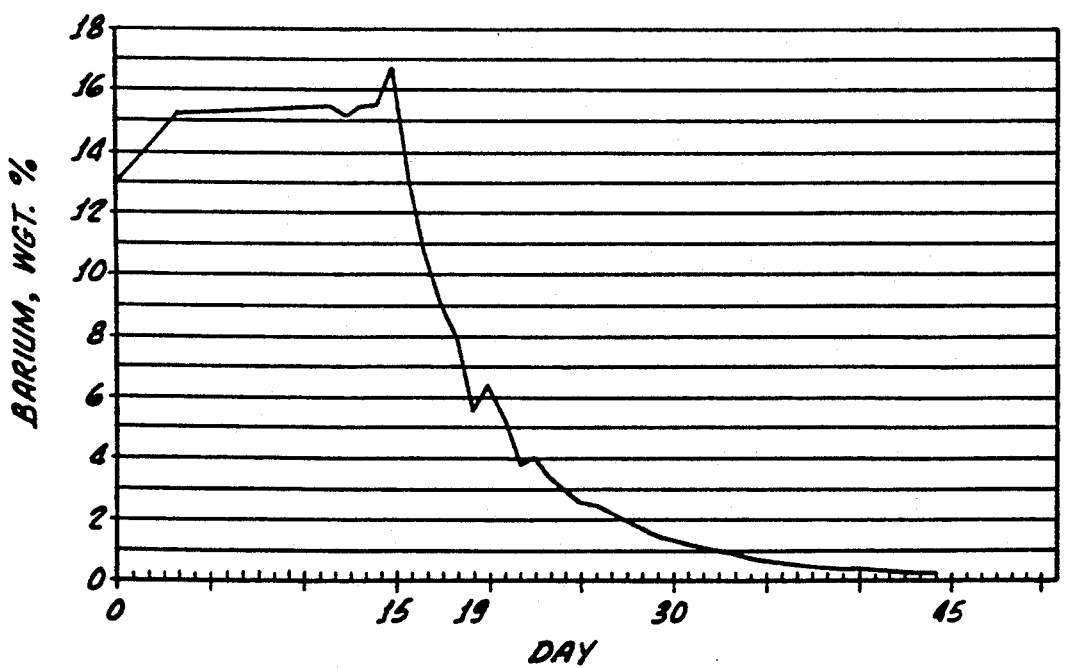
FIG. 5 shows a graphical representation of barium concentration versus day number using the method of the present invention.
Figure 6:
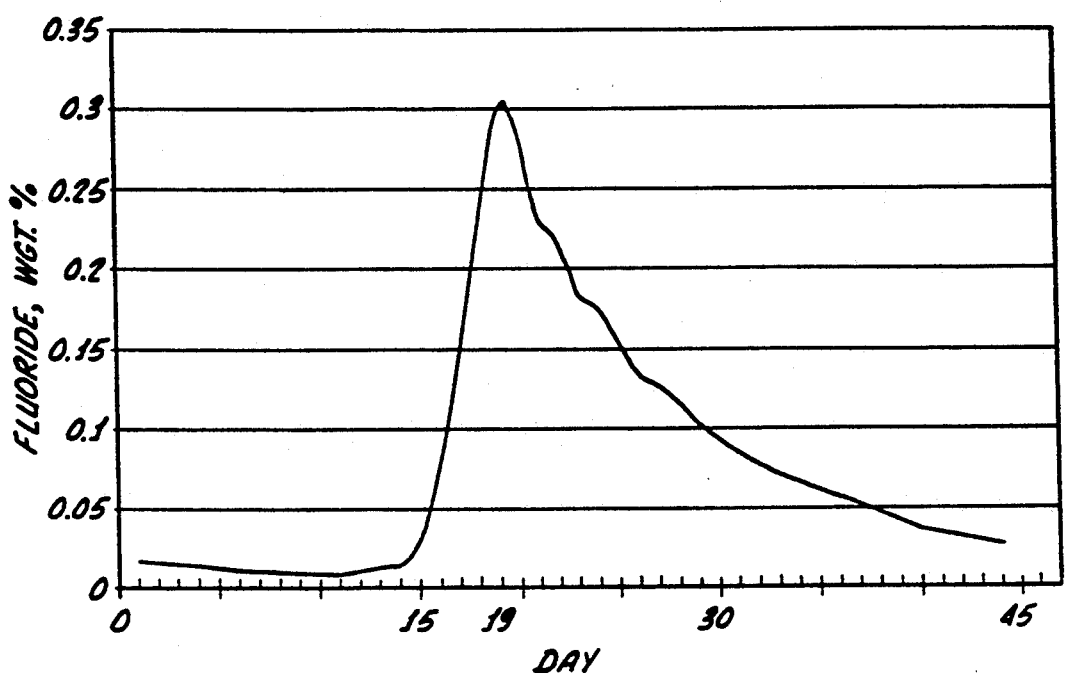
FIG. 6 shows a graphical representation of fluoride concentration versus day number after using the method of the present invention.

Although the results of addition of the first scale inhibitor had been tested for many days, only the last fifteen days data are recorded graphically as days one through fifteen on FIGS. 4 through 6. The addition of polyacrylate dispersant was stopped at day fifteen and no scale inhibitor of any kind was added for the next four days. On day nineteen, the addition of phosphonomethyl amine, sold under the brand name 3919 by Nalco Chemical Co., a crystal structure modifier type scale inhibitor, was commenced. Enough phosphonomethyl amine was continuously added to give a constant concentration of 8 ppmw in the effluent from the HPX.

Filter cake produced by the geothermal facility was analyzed. The concentrations of sulfur, barium, and fluoride and the amount of gamma radiation known to be produced by $Ra^{226}$ were measured daily and the value for each day plotted on the Figures. The variation in the concentrations of sulfur values is graphically depicted in FIG. 4, the variation of barium in FIG. 5, the variation of fluoride in FIG. 5, and the variation of $Ra^{226}$ radioactivity in FIG. 6. In each Figure, the effect of the dispersant on the concentration of the material followed is shown by the data for the first fifteen days, the effect of adding nothing is shown for the next four days, creating a sort of base line, and the effect of adding the crystal modifier is shown by the data for the last thirty days.

Most of the sulfur in the scale is present as barium sulfate. Therefore, the concentration of sulfur values in the filter cake is directly related to the concentration of barium. Referring to FIG. 4, it can be seen that the concentration of sulfur (as measured by Leco Model SC132 resistance furnace method) in the cake rose during the first 15 days of the test. Likewise, referring to FIG. 5, the concentration of barium rose for the first fifteen days. The concentrations of sulfur and barium in the cake did not change very much during the four day changeover period. One therefore can conclude that the addition of polyacrylate had little effect on the amount of sulfur precipitated. One day after the start of the addition of the phosphonomethylated amine, the concentration of sulfur in the filter cake started to plummet. The phosphonomethylated amine strongly inhibited the precipitation of sulfur values. Because most of the sulfur precipitates as barium sulfate, barium and sulfur concentrations are directly related. Phosphonomethylated amines are extremely good at inhibiting the precipitation of both barium and sulfur, as sulfate.

Fluoride concentrations were measured directly by selective an ion electrode that measured a sodium carbonate fusion solution prepared from the solid filter cake. Referring to FIG. 6, it can be seen that the dispersant worked well to keep the fluoride concentration in the filter cake low. The concentration of fluoride was extremely low before the change over from the polyacrylate dispersant to the phosphonomethylated amine crystal structure modifier. After the dispersant was stopped the concentration of fluoride ion shot up. The addition of the phosphonomethylated amine brought the concentration down, but only slowly and not to the low level seen before the changeover. One therefore concludes that the polyacrylate dispersant was better for controlling fluoride than the phosphonomethylated amine crystal structure modifier.

Figure 7:
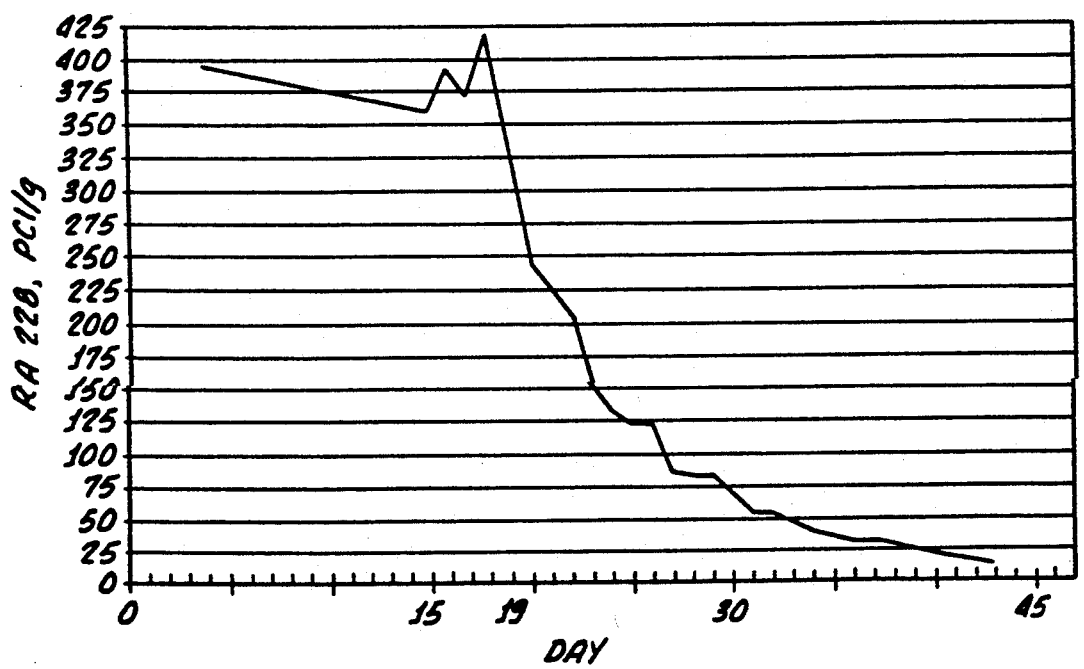
FIG. 7 shows a graphical representation of $Ra^{226}$ concentration versus day number after using the method of the present invention.

Radioactivity was measured by detecting gamma ray emissions known to emanate from $Ra^{226}$. In this Example, the total amount of radioactivity in the filter cake is assumed to be directly related to the amount of $Ra^{226}$ detected. Referring to FIG. 7, the amount of radioactivity in the filter cake during the first 15 days was relatively high. It did not increase substantially during the four day changeover period. One day after the start of the addition of the phosphonomethylated amine, the amount of radioactivity detected started to plummet. The phosphonomethylated amine crystal structure modifier was extremely good at lowering the amount of radioactivity in the filter cake and better at controlling the concentration of $Ra^{226}$ in the filter cake than the dispersant. Since it is currently believed most of the NORMs that are not $Ra^{226}$ are other chemically virtually indistinguishable isotopes of radium, one concludes that the phosphonomethylated amines are effective at controlling total radioactivity in the filter cake.

One unique feature and advantage in the invention is that, because the crystal modifier (e.g., the phosphonoamine) inhibits the deposition of NORMs and alkaline earth sulfates, the amount of deposits produced in the clarification stages is substantially reduced. In one geothermal facility, the amount of solids produced in the clarification stages was reduced by 40% by weight (from about 45 tons per day to about 27 tons per day, based on the total solids produced in the primary and secondary clarifiers). In addition to facilitating the handling of far less solids, the solids produced can be readily used for other purposes. This latter result is a direct result of the fact that the solids, due to the method of the invention, contain only innocuous proportions of NORMs. Thus, the invention provides a method for decreasing solids production in the clarification stages, e.g., by at least 20%, preferably by at least 30%, and most preferably by at least 40%, while simultaneously providing commercially useful solids, e.g., as a component for producing concrete. In addition, the invention improves the efficiency of the clarification stages by more selectively removing the agents which are known to plug injection wells rapidly (i.e., silicon-containing components) while keeping the NORMs and alkaline earth sulfates either dissolved or in suspension.

It should also be noted that, because the phosphonoamines generate a negative charge on the particles precipitating in the clarifiers, a cationic flocculant becomes particularly preferred for use in the secondary clarifier in those embodiments in which a phosphonoamine is used to inhibit NORMs and alkaline earth deposition. Some anionic flocculants have been found to be ineffective in the presence of phosphonoamines.

Finally, it is emphasized that the crystal structure modifier is most preferably added in the approximate region where barium sulfate first begins to nucleate. (For the system shown in the drawing, this is at LPX54.) The reason for this is that it is most preferred to stop the growth of the barium sulfate when it is of only microscopic size.

Although this invention has been primarily described in terms of specific examples and embodiments thereof, it is evident that the foregoing description will suggest many alternatives, modifications, and variations to those of ordinary skilled the art. Accordingly, the appended claims are intended to embrace as being within the spirit and scope of invention, all such alternatives, modifications, and variations.

What is claimed is:

1. A method for treating a feed geothermal brine containing silicon-containing components and naturally occurring radioactive materials comprising:

introducing said brine into a clarification zone in which silicon-containing components are induced to deposit by addition of a flocculating agent;

inhibiting the deposition of naturally occurring radioactive materials in said clarification zone by introducing into said clarification zone a crystal structure modifier; and recovering from said clarification zone a product geothermal brine of substantially reduced content of silicon-containing components but containing a substantial proportion of the naturally occurring radioactive materials originally contained in said feed geothermal brine.

2. A method as defined in claim 1 wherein said feed geothermal brine contains fluorides, one or more alkaline earth components, and one or more metal values, and said method further comprises:

recovering said one or more metal values while inhibiting the contamination of said metal values with fluorides by adding a dispersant.

3. A method for treating a feed geothermal brine containing silicon-containing components and naturally occurring radioactive materials comprising:

introducing said brine into a clarification zone in which silicon-containing components are induced to deposit by addition of a flocculating agent;

inhibiting the deposition of naturally occurring radioactive materials in said clarification zone by introducing into said clarification zone a phosphono-lower-alkylated amine; and recovering from said clarification zone a product geothermal brine of substantially reduced content of silicon-containing components but containing a substantial proportion of the naturally occurring radioactive materials originally contained in said feed geothermal brine.

4. A method as defined in claim 2 wherein the phosphono-lower-alkylated amine has the following formula: (3)

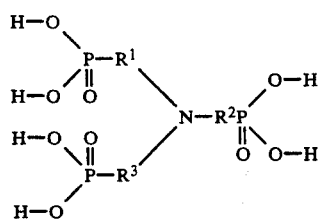

where $R^1$, $R^2$, and $R^3$ are the same or different and are (a) lower alkylene or (b) $NR^5R^6$, where $R^5$ and $R^6$ are the same or different, and $R^5$ is a lower alkyl radical, hydrogen atom, or $R^7PO_3H_2$ (where $R^7$ is a lower alkylene radical), and $R^6$ is a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkylene refers to alkylene radicals having from one to ten carbon atoms.

5. A method as defined in claim 3 wherein at least 33% of the naturally occurring radioactive materials in the feed geothermal brine are also contained in said product geothermal brine.

6. A method as defined in claim 3 wherein said feed geothermal brine contains fluorides, one or more alkaline earth components, and one or more metal values, and said method further comprises:

recovering said one or more metal values while inhibiting the contamination of said metal values with fluorides by adding a dispersant.

7. A method as defined in claim 6 wherein the phosphono-lower-alkylated amine has the following formula: (4)

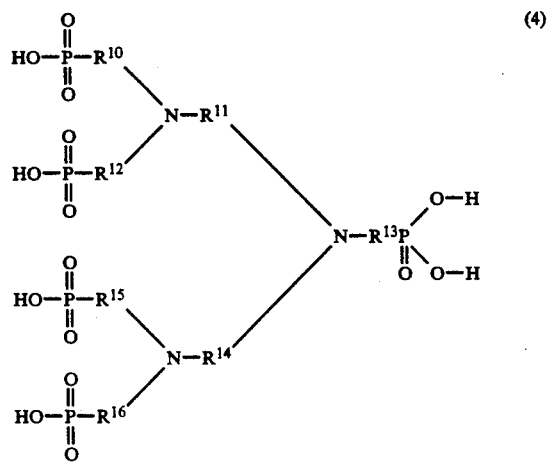

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

8. A method as defined in claim 3 wherein said feed geothermal brine contains fluorides, one or more alkaline earth components, and one or more metal values, and said flocculating agent is cationic, and said method further comprises:

recovering said one or more metal values from the product geothermal brine and inhibiting the contamination of said metal values with fluorides by adding to said product geothermal brine a fluoride-depositing inhibitor component selected from the group consisting of polyacrylates, polyphosphonic acids, polyethylene imines, phosphono-lower alkylated amines, sulfonated polyacrylates, amino-lower-alkyl phosphonates, polyacrylate-acrylamide copolymers, salts of polyacrylate, acrylic acid, polymaleic acid, acrylic acid-maleic acid copolymers, phosphate esters, and phosphono-carboxylate xylate.

9. A method as defined in claim 8 wherein said feed geothermal brine contains silver and one or more silver components are recovered from said product geothermal brine as at least one of said metal values.

10. A method as defined in claim 9 wherein:
(a) not all the silicon-containing components of said feed geothermal brine deposit in said clarification zone, so that said product geothermal brine contains residual silicon-containing components;
(b) said recovering comprises depositing said metal values including one or more silver components upon a metal surface.

11. A method as defined in claim 10 wherein:
(1) said recovering comprises passing said product geothermal brine through a conduit containing chicken wire, with at least some of said residual silicon-containing components and at least some of said metal values including one or more silver components depositing on said chicken wire, and
(2) the product geothermal brine after said recovering of metal values is injected into the earth.

12. A method as defined in claim 11 wherein
(A) the flocculating agent comprises a cationic compound having the following repeating formula structure:

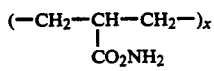
$$(-CH_2-CH-CH_2-)_x \quad (2)$$
$$| \atop CO_2NH_2$$

where $x = 10,000$ to $25,000$ and
(B) the fluoride-depositing inhibitor component comprises a polyacrylate having the following repeating formula structure:

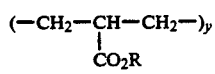
$$(-CH_2-CH-CH_2-)_y$$
$$| \atop CO_2R$$

where R is selected from the group consisting of hydrogen and alkyl radicals having six or fewer carbon atoms and $y = 25$ to $200$.

13. A method as defined in claim 11 wherein the phosphono-lower-alkylated amine has the following formula: (3)

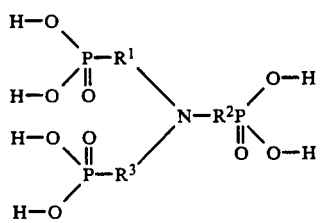

where $R^1$, $R^2$, and $R^3$ are the same or different and are (a) lower alkylene or (b) $NR^5R^6$, where $R^5$ and $R^6$ are the same or different, and $R^5$ is a lower alkyl radical, hydrogen atom, or $R^7PO_3H_2$ (where $R^7$ is a lower alkylene radical), and $R^6$ is a lower alkyl radical, a hydrogen atom, $(NR^8)_2$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkylene refers to alkylene radicals having from one to ten carbon atoms.

14. A method as defined in claim 9 wherein the recovered metal values contain less than 0.4 wt. % fluorides.

15. A method as defined in claim 14 wherein at least 33% of the naturally occurring radioactive materials in the feed geothermal brine are ultimately injected into the earth with said product geothermal brine.

16. A method as defined in claim 9 wherein
(A) the flocculating agent comprises a cationic compound having the following repeating formula structure:

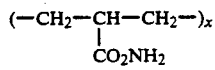
$$(-CH_2-CH-CH_2-)_x$$
$$| \atop CO_2NH_2$$

where $x = 10,000$ to $25,000$ and (B) the fluoride-depositing inhibitor component comprises a polyacrylate having the following repeating formula structure:

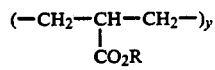
$$(-CH_2-CH-CH_2-)_y$$
$$| \atop CO_2R$$

where R is selected from the group consisting of hydrogen and alkyl radicals having six or fewer carbon atoms and $y = 25$ to $200$.

17. A method as defined in claim 9 wherein at least 33% of the naturally occurring radioactive materials in the feed geothermal brine are ultimately injected into the earth with said product geothermal brine.

18. A method as defined in claim 3 wherein said feed geothermal brine contains fluorides, one or more alkaline earth components, and one or more metal values comprising silver, and said flocculating agent is a cationic component having the following repeating formula structure:

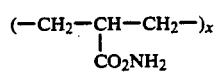
$$(-CH_2-CH-CH_2-)_x \quad (2)$$
$$| \atop CO_2NH_2$$

where $x = 10,000$ to $25,000$ and
said method further comprises recovering said one or more metal values from the product geothermal brine while inhibiting the contamination of said metal values with fluorides by adding to said feed geothermal brine a polyacrylate having the following repeating formula structure:

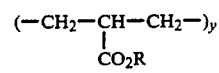
$$(-CH_2-CH-CH_2-)_y \quad (1)$$
$$| \atop CO_2R$$

where R is selected from the group consisting of hydrogen and alkyl radicals having six or fewer carbon atoms and $y = 25$ to $200$.

19. A method as defined in claim 18 wherein said feed geothermal brine contains silver and one or more silver components are recovered from said product geothermal brine as at least one of said metal values, said metal values containing less than 25% of the fluoride originally present.

20. A method as defined in claim 3 wherein at least 33% of the naturally occurring radioactive materials in the feed geothermal brine are ultimately injected into the earth with said product geothermal brine.

21. A method for treating a feed geothermal brine containing silicon-containing components and naturally occurring radioactive materials comprising:
introducing said brine into a clarification zone in which silicon-containing components are induced to deposit by addition of a flocculating agent;
inhibiting the deposition of naturally occurring radioactive materials in said clarification zone by introducing into said clarification zone a phosphono-lower-alkylated amine; and
recovering from said clarification zone a product geothermal brine of substantially reduced content of silicon-containing components but containing a greater percentage of the naturally occurring radioactive materials originally contained in said feed geothermal brine than would be contained in the brine if said phosphono-lower-alkylated amine were not introduced into said clarification zone.

22. A method as defined in claim 21 wherein the phosphono-lower-alkylated amine has the following formula: (4)

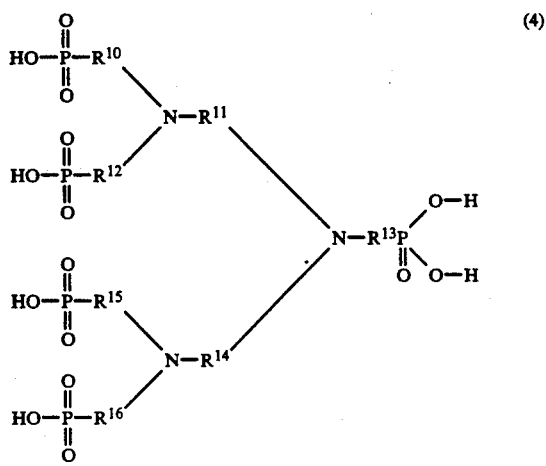

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

23. A method as defined in claim 21 wherein said feed geothermal brine contains one or more alkaline earth components and said flocculating agent is cationic.

24. A method as defined in claim 21 wherein said feed geothermal brine contains fluorides, one or more alkaline earth components, and one or more metal values, and said method further comprises:
recovering said one or more metal values from the product geothermal brine and
inhibiting the contamination of said metal values with fluorides by adding to said product geothermal brine a fluoride-depositing inhibitor component selected from the group consisting of polyacrylates, polyphosphonic acids, polyethylene imines, phosphono-lower-alkylated amines, sulfonated polyacrylates, amino-lower-alkyl phosphonates, polyacrylate-acrylamide copolymers, salts of polyacrylate, acrylic acid, polymaleic acid, acrylic acid-maleic acid copolymers, phosphate esters, and phosphono-carboxylate xylate.

25. A method as defined in claim 24 wherein said feed geothermal brine contains silver and one or more silver components are recovered from said product geothermal brine as at least one of said metal values.

26. A method as defined in claim 25 wherein:
(a) not all the silicon-containing components of said feed geothermal brine deposit in said clarification zone, so that said product geothermal brine contains residual silicon-containing components;
(b) said recovering comprises depositing said metal values including one or more silver components upon a metal surface.

27. A method as defined in defined in claim 26 wherein:
(1) said recovering comprises passing said product geothermal brine through a conduit containing chicken wire, with at least some of said residual silicon-containing components and at least some of said metal values including one or more silver components depositing on said chicken wire, and
(2) the product geothermal brine after said recovering of metal values is injected into the earth.

28. A method as defined in claim 27 wherein
(A) the flocculating agent comprises a cationic compound having the following repeating formula structure:

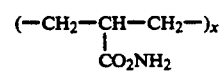

where $x = 10,000$ to $25,000$ and
(B) the fluoride-depositing inhibitor component comprises a polyacrylate having the following repeating formula structure:

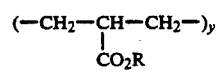

where R is selected from the group consisting of hydrogen and alkyl radicals having six or fewer carbon atoms and $y = 25$ to $200$.

29. A method as defined in claim 28 wherein the recovered metal values are essentially free of fluorides.

30. A method as defined in claim 29 wherein a substantial portion of the naturally occurring radioactive materials in the feed geothermal brine are ultimately injected into the earth with said product geothermal brine.

31. A method as defined in claim 30 wherein the flocculating agent is present in said clarification zone in a concentration from about 0.1 to about 1 ppmw.

32. A method as defined in claim 1 wherein the phosphono-lower-alkylated amine has the following formula: (3)

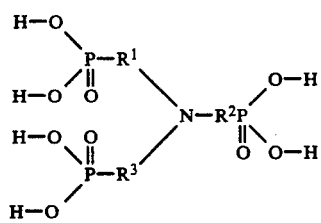

where $R^1$, $R^2$, and $R^3$ are the same or different and are (a) lower alkylene or (b) $NR^5R^6$, where $R^5$ and $R^6$ are the same or different, and $R^5$ is a lower alkyl radical, hydrogen atom, or $R^7PO_3H_2$ (where $R^7$ is a lower alkylene radical), and $R^6$ is a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkylene refers to alkylene radicals having from one to ten carbon atoms.

33. A method as defined in claim 31 wherein the phosphono-lower-alkylated amine has the following formula: (4)

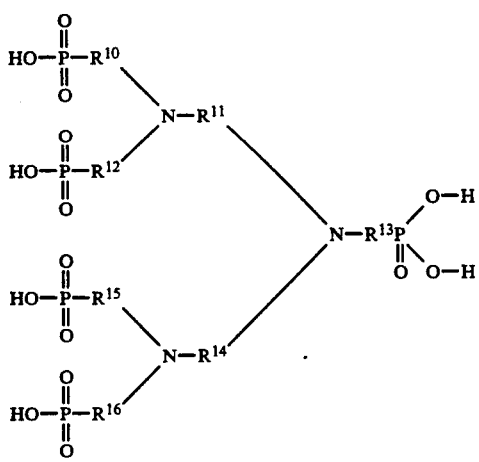

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

34. A method as defined in claim 30 wherein the phosphono-lower-alkylated amine has the following formula: (3)

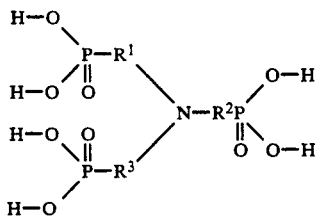

where $R^1$, $R^2$, and $R^3$ are the same or different and are (a) lower alkyl or (b) $NR^5R^6$, where $R^5$ and $R^6$ are the same or different, and $R^5$ can be a lower alkyl radical, hydrogen atom, or $RPO_3H_2$ (where $R^7$ is a lower alkylene radical), and $R^6$ can be a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkylene refers to alkylene radicals having from one to ten carbon atoms.

35. A method as defined in claim 26 wherein the phosphono-lower-alkylated amine has the following formula: (4)

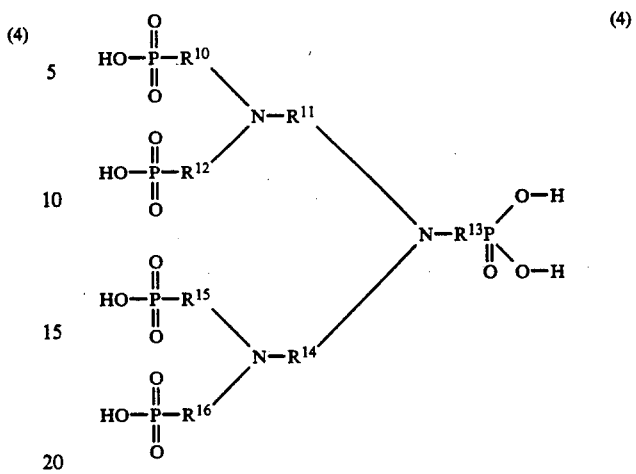

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

36. A method as defined in claim 25 wherein (A) the flocculating agent comprises a cationic compound having the following repeating formula structure:

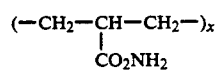

where $x = 10,000$ to $25,000$ and (B) the fluoride-depositing inhibitor component comprises a polyacrylate having the following repeating formula structure:

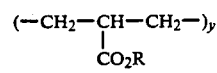

where R is selected from the group consisting of hydrogen and alkyl radicals having six or fewer carbon atoms and $y = 25$ to $200$.

37. A method as defined in claim 36 wherein the recovered metal values contain less than 0.4 wt. % fluorides.

38. A method as defined in claim 37 wherein at least 33% of the naturally occurring radioactive materials in the feed geothermal brine are ultimately injected into the earth with said product geothermal brine.

39. A method as defined in claim 36 wherein the phosphono-lower-alkylated amine has the following formula: (4)

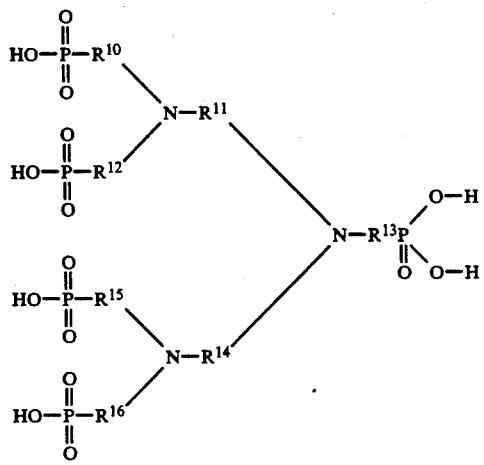

(4)

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

40. A method as defined in claim 25 wherein the recovered metal values are essentially free of fluorides.

41. A method as defined in claim 40 wherein a substantial portion of the naturally occurring radioactive materials in the feed geothermal brine are ultimately injected into the earth with said product geothermal brine.

42. A method as defined in claim 25 wherein a substantial portion of the naturally occurring radioactive materials in the feed geothermal brine are ultimately injected into the earth with said product geothermal brine.

43. A method as defined in claim 24 wherein the phosphono-lower-alkylated amine has the following formula: (3)

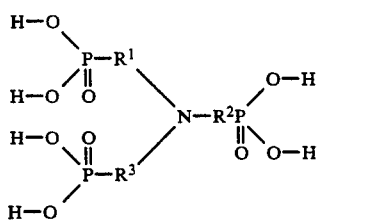

(3)

where $R^1$, $R^2$, and $R^3$ are the same or different and are (a) lower alkylene or (b) $NR^5R^6$, where $R^5$ and $R^6$ are the same or different, and $R^5$ is a lower alkyl radical, hydrogen atom, or $R^7 PO_3H_2$ (where $R^7$ is a lower alkylene radical), and $R^6$ is a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkylene refers to alkylene radicals having from one to ten carbon atoms.

44. A method as defined in claim 21 wherein a substantial portion of the naturally occurring radioactive materials in the feed geothermal brine are ultimately injected into the earth with said product geothermal brine.

45. A method for treating a feed geothermal brine containing silicon-containing components, fluoride ions, and one or more metal values comprising:
introducing said brine into a clarification zone in which silicon-containing components are induced to deposit by addition of a flocculating agent;
recovering from said clarification zone a product geothermal brine of substantially reduced content of silicon-containing components;
and recovering metal values originally present in the brine in the presence of a dispersant for inhibiting contamination of said metal values with fluorides present in the brine.

46. A method for treating a feed geothermal brine containing silicon-containing components, fluoride anions, one or more alkaline earth cations, and one or more metal values comprising silver, said method comprising:
introducing said brine into a clarification zone in which silicon-containing components are induced to deposit by addition of a flocculating agent;
recovering from said clarification zone a product geothermal brine of substantially reduced content of silicon-containing components; and
recovering metal values comprising silver from said product geothermal brine in the presence of a fluoride-depositing inhibitor selected from the group consisting polyacrylates, polyphosphonic acids, polyethylene imines, phosphono-lower-alkylated amines, sulfonated polyacrylates, amino-lower-alkyl phosphonates, polyacrylate-acrylamide copolymers, salts of polyacrylate, acrylic acid, polymaleic acid, acrylic acid-maleic acid copolymers, phosphate esters, and phosphonocarboxylate xylate.

47. A method as defined in claim 46 wherein:
(A) the flocculating agent comprises a cationic compound having the following repeating formula structure:

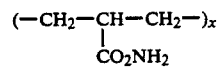

where x=10,000 to 25,000, and
(B) the fluoride-depositing inhibitor component comprises a polyacrylate having the following repeating formula structure:

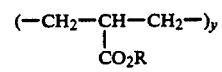

where R is selected from the group consisting of hydrogen and alkyl radicals having six or fewer carbon atoms and y=25 to 200; and
(C) the inhibitor is present in said clarification zone.

48. A method as defined in claim 46 wherein:
(A) the flocculating agent comprises a cationic compound having the following repeating formula structure:

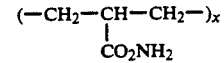

where x=10,000 to 25,000, and (B) the fluoride-depositing inhibitor component comprises a polyacrylate having the following repeating formula structure:

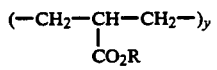

where R is selected from the group consisting of hydrogen and alkyl radicals having six or fewer carbon atoms and $y = 25$ to 200;

(C) the metal values comprising silver are recovered by deposition onto a metal surface.

49. A method as defined in claim 48 wherein said metal values comprising silver are recovered in a conduit located downstream of said clarification zone, said conduit containing chicken wire, onto which silicon-containing components and metal values comprising silver deposit, and after said recovering, the product geothermal brine is injected into the earth.

* * * * *

UNITED STATES PATENT AND TRADEMARK OFFICE
CERTIFICATE OF CORRECTION

PATENT NO. : 5,288,411
DATED : February 22, 1994
INVENTOR(S) : Gallup et al.

It is certified that error appears in the above-indentified patent and that said Letters Patent is hereby corrected as shown below:

In column 17, line 38, claim 4, delete "claim 2" and insert therefor -- claim 3 --.

In column 17, line 57, claim 4, delete "$(NR^8)_2$" and insert therefor -- $(NR^8)_z$ --.

In column 19, line 46, claim 13, delete "$(NR^8)_2$" and insert therefor -- $(NR^8)_z$ --.

In column 22, line 39, claim 32, delete "claim 1" and insert therefor -- claim 31 --; line 59, delete "$(NR^8)_2$" and insert therefor -- $(NR^8)_z$ --.

In column 23, line 50, claim 34, delete "alkyl" and insert therefor -- alkylene --; line 51, delete "$RPO_3H_2$" and insert therefor -- $R^7PO_3H_2$ --; line 53, delete "alkyl" and insert therefor -- alkylene --; and line 55, replace "$(NR^8)_2$" with -- $(NR^8)_z$ --.

In column 25, line 57, claim 43, replace "$NR^8)_2$" with -- $(NR^8)_z$ --.

Signed and Sealed this

Twenty-third Day of August, 1994

Attest:

BRUCE LEHMAN

Attesting Officer

Commissioner of Patents and Trademarks